Jan. 19, 1965 R. L. OLSON 3,166,332
PRESSURE ASSEMBLY COMPRISING A SEALING STRIP OF ELASTOMERIC
MATERIAL HAVING COMPRESSIBLE GAS CELLS
Filed May 26, 1961 4 Sheets-Sheet 1

Inventor
Richard L. Olson

United States Patent Office 3,166,332
Patented Jan. 19, 1965

3,166,332
PRESSURE ASSEMBLY COMPRISING A SEALING STRIP OF ELASTOMERIC MATERIAL HAVING COMPRESSIBLE GAS CELLS
Richard Laurence Olson, Chicago, Ill.
Filed May 26, 1961, Ser. No. 123,917
5 Claims. (Cl. 277—171)

The present invention relates broadly to improvements in pressure assemblies and more particularly to such assemblies including a sealing strip of elastomeric material having bubble-like compressible gas cells.

This invention relates broadly to improvements in various different types of elastically returnable, seals, gaskets or other fluid pressure holding devices such as valves including a sealing part and specifically to improvements in the sealing of assemblies defining therein some sort of hollow space subject to differential pressure conditions relative to the atmosphere externally of the assembly, and more particularly concerns the sealing of the parting faces between the members of the assembly by a novel sealing strip.

In another specific seal aspect, this invention also relates to single pocket pressure seals and to improvements in a novel resilient seal structure especially suitable for highly resisting passage of pressure in one direction within a jointed assembly.

This application is a continuation-in-part of my application Serial No. 696,271 for Sealing the Parting Faces of Molding Apparatus and the Like Against Blow-By, filed on November 13, 1957, now abandoned, and my application Serial No. 779,144 for Single Pocket Pressure Seal, filed on December 9, 1958, now abandoned.

It is noted that heretofore it has been common to utilize resilient but non-compressible sealing devices such as O-rings and other types of rubber sealing gaskets or strips interposed between the parting faces of assemblies subject to differential internal and external pressures liable to leak through the joint or parting face of the assembly. However, where the pressure differential is of substantial magnitude either continuously or by way of surges of pressure, and especially where abrasive substance is entrained in air or other gas liable to leak or blow through the joint, problems of leakage, and in the case of abrasive materials, erosion, are encountered. These problems are especially true, and in many instances aggravated where it is necessary or expedient to have the sealing member loosely disposed in a groove in one of the parting faces and pressing against a smooth, ungrooved opposing parting face.

Sand molding apparatus, especially, presents the problem of erosion of the parting faces. Typical of such molding apparatus are core boxes, pressure molds, blow plates and mating flasks or molds, blow plates and the mating parting face of the magazines of core blowing machines, and the like. In a typical sand mold blowing assembly, a blow plate is carried by the sand magazine in clamped-on relation and is engageable under pressure against an outer face of a core box assembly, or directly against a parting face of a dump-type mold box, or against the parting face of a blow-in dryer. One or more streams of air and sand particles, including a suitable binder, are blown by compressed air from the magazine into the cavity defined in the mold box or flask. Because of the abrasive character of the sand it is imperative to provide against at least leakage of sand under air pressure velocity through the parting face or faces of the assembly. Even though a completely air-tight joint at the junction or parting face of any of the involved sections of the apparatus may not prevail, there must at least be no escape of sand through the joint with abrasive velocity. Any blow-by of sand causes erosion of the mating surfaces, eventually requiring repairs to avoid increasing leakage. In a leaky mold the molded members will show the effects of leakage by fins at the parting line between the sections, piping, ratholes, soft spots, and the like, necessitating costly patching and repairs and often resulting in excessive scrap.

In prior attempts to provide resilient compression seals under conditions as outlined above, many failures have been encountered, especially in high production units. Generally the prior seals have been formed from discontinuous strips subject to leakage where the ends of the strip sections came together. The strips have not been generally, secured within parting face grooves in a manner to prevent material such as sand from getting in behind the sealing strip and prevent proper functioning of the sealing strip. Prior sealing strips have generally lacked capability of variability as to compression factor to meet different pressure conditions for which the associated apparatus may be designed. One of the principal deficiencies in prior compression seals has resided in the great difficulty or even impracticability of attaining proper sealing where the parting faces are of contoured form.

In further reference to another seal aspect or form of this invention, it is noted that, with most resilient pressure seals adaptable for sealing off a cavity or other chamber or passage there is a pocket or space along each side of the seal strip or ring. However, there are numerous instances in which the presence of such a space on the cavity or chamber side of the seal is highly undesirable. An example resides in high vacuum chambers where such space is exceedingly detrimental to the efficient operation of a process. The space on the chamber side of the seal has trapped atmospheric air. During the pump down cycle in the evacuation of the chamber there is a progressive leakage of the air from the space on the side of the seal nearest the chamber thus continuously contaminating the vacuum over an unduly prolonged and unpredictable length of time.

In some industrial processes, it is desirable to maintain pressure on one side of a joint but to have at least the ability to leak through from the opposite side of the joint. Examples are flame arresters, explosion proof switch gear, by-pass systems, variable pressure regulators, and the like. However, with conventional seals this has been either impossible or extremely difficult of attainment.

It is accordingly an important object of the present invention to provide a new and improved seal structure for the parting faces of apparatus subject to substantial differential internal and external pressures, and more particularly to provide such a sealing structure that will overcome and obviate the various difficulties outlined hereinabove, as well as to afford advantages and to avoid difficulties that may not have been mentioned.

Another object is to provide a new and improved sealing device especially suitable for separable components of high production apparatus.

A further object of this invention is to provide a novel parting face seal which is readily predeterminable with respect to desirable compression factors to meet the requirements of various operating pressure conditions.

Still another object of this invention is to provide a novel sponge rubber type compression seal especially well adapted for pressure sand molding and like apparatus.

With reference to another specific seal aspect, it is an important object of the present invention to provide an improved resilient pressure seal which is highly effective to maintain pressure on one side of a joint and on which side the seal has an advantageous pocket groove trap while the opposite side of the seal is adapted for flush face abutment with opposing surface of the joint and freedom from grooves or wrinkling or pockets.

Another object of this invention is to provide an improved unidirectional seal structure.

A further object of this invention is to provide a novel resilient single pocket pressure seal providing a sealing pocket trap along one side and having the opposite side constructed and arranged to permit pressure passage therebythrough under predetermined conditions from that side toward the pocket side, whereby to permit one-way by-pass or leakage with respect to the seal.

A more particular object of the sealing aspects of this invention relates to the providing of a seal, gasket or the like comprising small, interconnected and gas filled bubbles of flexible (and more particularly of elastomeric) material to provide flexible deformability and resilient compressibility by the compression and volume reduction of said small gas volumes together with high strength, wear resistance, long life and the ability to withstand and hold high fluid pressures as well as to withstand high engaging pressures.

Other objects, features and advantages of this invention in its several different aspects will be apparent to those skilled in the arts of seals, gaskets, packings or the like, from the following more detailed descriptions taken in conjunction with the accompanying drawings wherein like reference characters refer to like parts and wherein.

Figure 1:
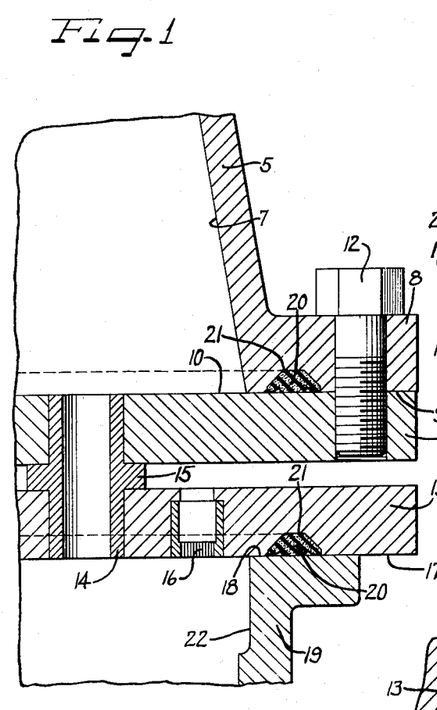
FIGURE 1 is a fragmentary vertical sectional detail view through a portion of a core blowing machine magazine structure and an associated core box member and representative of pressure assemblies embodying the invention.

Referring first to the first seal embodiment; in FIGURE 1, by way of illustration, a sand blowing machine magazine 5 is shown providing a chamber or hopper 7 within which is housed a charge of core sand and suitable binder. About its lower end, the magazine 5 has a lateral attachment flange 8 providing a parting face 9 against which a parting face marginal area of a surface 10 of a blow plate member 11 is adapted to be drawn under compression by securing means such as bolts 12. In the present instance the blow plate includes in addition to the plate member 11 serving as the bottom closure for the magazine, a lower blow plate member 13, with the blow plate members connected together by one or more blow bushings 14 provided with respective spacer flanges 15 between the plates to maintain the same in spaced relation so as to afford exhaust space or gap for screened vents 16 in the lower plate 13. Marginally the lower blow plate member 13 has a lower face 17 adapted to be disposed in marginal parting face compressed relation to a parting face 18 of a sand mold 19 such as a dump core box, blow-in dryer, and the like.

Since the sand used for molding purposes is necessarily of fine mesh screen grade, and the air pressure used in blowing the sand from the reservoir chamber 7 is from 40 to 140 lbs. per square inch, depending upon practical requirements in any particular case, and may even exceed such pressure in special situations, blow-by through the parting faces is a hazard that must be guarded against. If it were possible always to maintain perfect metal-to-metal contact at the parting faces the problem would not exist. As a practical matter the necessary perfection of metal-to-metal contact is not attainable, and the particles of sand or other foreign material between the parting faces, as well as warpages that may occur make it necessary to provide some sort of sealing means of a yieldable, conformable nature to seal the parting faces against blow-by.

According to the present invention there is provided a novel compression type seal that is carried by one of the parting faces at each separable joint and is engageable under compression against the opposing parting face. Since the blow plate assembly 11, 13 is separable from the magazine 5 the parting faces 9 and 10 are so equipped by the provision of a compression seal 20 according to the present invention. Since the core box member 19 is necessarily separable from the blow plate, the parting faces 17 and 18 are provided with such a compression seal 20. It is generally expedient to have the seal 20 carried by the parting face flange 8 of the magazine, and by the lower plate 13 of the blow plate assembly. Since, as shown, the seals 20 are substantially identical, a description of the seal 20 between the parting faces 17 and 18 will suffice for both of the illustrated seals.

Figure 2:
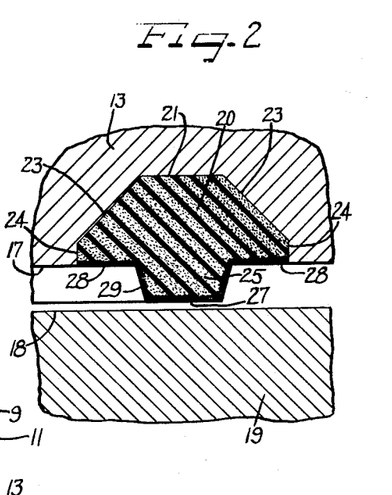
FIGURE 2 is a substantially enlarged fragmentary sectional detail view, taken in substantially the same plane as FIGURE 1 but showing only one of the sealing strips and the immediately adjacent components of the assembly and with the parting faces of the components separated.

Referring to FIGURE 2 wherein the condition of the seal 20 is shown when the parting faces 17 and 18 are separated, it will be observed that the principal body mass of the seal is contained in a groove 21 recessed into the party face 17 and opening therefrom. The groove 21 is provided continuously throughout any given length or width or perimeter or outline desired in the parting face 17 such, for example, throughout a closed outline conformable to a cavity 22 within the core box 19 spaced outwardly relative to the point at which the wall defining the cavity 22 meets the parting face 17 of the blow plate in the assembly. The sides of the groove 21 are provided with tapered, outwardly flaring portions 23 from a flat bottom and leading into outer terminal side portions 24 which are preferably substantially normal to the plane of the parting face 17. It will be observed that the groove 21 flares to a greater width than depth.

Within the groove 21, the seal 20 is bonded in full adherence to all of the groove surfaces, completely filling the groove with a longitudinal ridge 25 projecting normally beyond the plane of the parting face 17 and located opposite the bottom of the groove. On its opposite sides, the ridge 25 preferably tapers toward a truncated crown face 27 which is engageable sealingly with the opposing parting face 18. At its base the seal rib 25 is substantially narrower than the outer face width of the seal body, with the provision of face panels 28 on the seal body conveniently coplanar with the parting face 17 and from which the rib ridge 25 projects for compression sealing engagement with the opposing parting face 18. In one preferred form, as shown, the crown 27 of the sealing ridge rib 25 is about as wide as the width of the flat bottom portion of the groove 21 and is somewhat wider than the width of the side panel surfaces 28, but the offset height or projections of the ridge rib from the surfaces 28 is less than its base width so as to substantially resist any substantial side flexing or turning over of the ridge rib under compression.

The best results have been obtained by making the seal 20 from a compressible, cellular elastomer possessing a high degree of resiliency. While cellular rubber as such may be used, different types of synthetic resinous materials that are capable of being molded and set to a compressible, cellular elastomer may be used. The seal material is conformed to the contour of the groove 21 and bonded thereto with such thorough adherence that during compression the seal will not separate from the surfaces defining the groove and, more particularly, the terminal surfaces 24 of the groove; thereby sand or other foreign material will be prevented from entering alongside of or behind the seal but will be positively excluded.

In a preferred method, such as in my Patent No. 2,815,549, the material used for the seal 20 is such as may be cured in situ by vulcanization or baking. To this end, the composition of the seal material may include suitable natural or synthetic rubber, a plasticizer, a vulcanizing agent, and a gas liberating agent capable upon the application of heat of liberating substantial quantities of gas and thereby swelling or expanding the elastomeric composition and producing a self-sustaining, resilient, elastic multi-cellular sponge rubber-like body.

After the groove 21 has been formed to open through the parting face 17 and a master plate has been provided with a matching groove corresponding to the preferred width and shape and depth of the ridge rib portion 25 of the seal, a suitable quantity of the raw material for the seal is placed into one of the grooves and the members brought together so that the member 13 with the master plate (not shown) assembled provide a complete chamber of the confronting grooves. The assembly is then placed in a curing oven and subjected to proper temperature or temperatures for the proper length of time to effect expansion and curing of the seal material into a homogeneous cellular, sponge body uniformly throughout the length and width of the seal. By having the surfaces within the groove 21 treated to assure active bonding of the material of the seal 20 thereto as an incident to the curing process, and by having the surfaces of the master plate opposing the groove 21 treated to assure non-adherence thereto of the material of the seal 20, upon separation of the master plate from the member 13 after curing, the seal 20 separates from the master plate but is carried bonded to the member 13 within the groove 21.

By virtue of the separation treatment of the master plate surfaces, as described, and by virtue of the internal pressures developed within the seal material during the curing, a substantially sand impervious skin 29 is formed providing the surfaces of the ridge rib 25 and the faces 28 of the seal. This is advantageous in avoiding gathering on or retention of sand on the exposed surfaces of the seal 20, or leakage or seepage of air through the seal body.

Upon pressing the members 13 and 19 together to bring the parting faces 17 and 18 thereof into substantial abutment, the crown surface 27 of the seal member 20 bears over its entire width and length against the opposing flat surface portion of the parting face 18 in sealing relation and the ridge rib 25 compresses into the groove 21, thereby compressing the material of the seal 20 to a substantially greater density than in the expanded projecting condition of the seal. Such densification is indicated in FIGURE 3 by denser shading as compared to FIGURE 2.

In fact, the compression factor of the seal can be predetermined to meet various pressure requirements. By varying the depth of the groove 21 while providing the same amount of material per linear area a denser and therefore more difficulty compressible seal can be effected in a shallower groove than in a deeper groove. On the other hand, by varying the amount of material per linear unit without varying the depth of the groove appropriate variation in density and thus compression factor can be attained.

Figure 3:
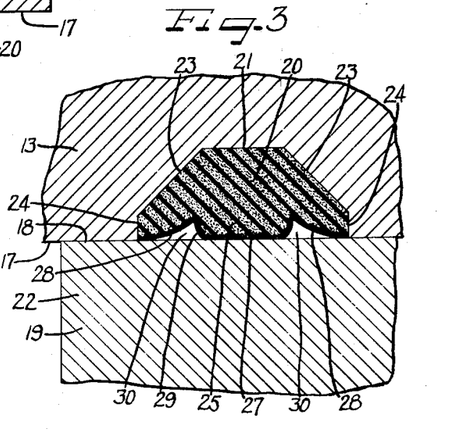
FIGURE 3 is a sectional detail view similar to FIGURE 2 but showing the parting faces clamped together with the sealing strip in the compressed sealing condition thereof.

It has been observed, as shown in FIGURES 1 and 3, that under compression not only does the rib ridge 25 of the seal become compressed but by yielding and compression of the body of the seal 20 presses into the body, while nevertheless maintaining its identity to some extent, at least. This is a result of the denser skin layer 29 providing the surface of the rib ridge and the side panel surfaces 28. In any event, the sides of the ridge rib 25 are forced inwardly as an incident to compression and draw the side panel surfaces 28 inwardly at the root of the ridge rib. This provides substantial dead air space chambers 30 alongside the compressed ridge rib 25 and in the form of reentrant grooves defined by the respective sides of the compressed ridge rib and the panel surfaces 28. This phenomenon is believed to account substantially for the unusual effectiveness of the present seal as compared to prior compression seals. Pressure differential through the parting face joint creating a fluid pressure impingement on one side of the compressed ridge rib 25 finds it still at least slightly yieldable laterally with the pressure being exerted over the area of the side of the ridge rib exposed within the chamber 30 into which the pressure phase of the differential is exerted, rather than being concentrated on the interface area of the compression ridge rib crown surface 27 and the opposing parting face 18. The slight yielding enabled in the compressed ridge rib absorbs any shocks or surges of pressure thereagainst.

Although because the parting faces 17 and 18 are held close together and wherever the pressure does travel through the parting face joint it must necessarily move the substantial escape velocity, upon entering and expanding in the dead air space chamber 30, its velocity is greatly reduced if not entirely dissipated to the extent that escape past the compressed ridge rib is substantially precluded. Especially where material such as sand may be entrained in the pressure fluid seeking to escape is this construction valuable since by dissipation of its velocity in the chamber 30, escape of the material is stopped.

Should perchance some pressure fluid and entrained material escape past the compressed rib ridge 25 due to some unusual condition, upon entering the second of the dead air space chambers 30 further escape of the material is stopped. It will be appreciated that such stoppage of escape of sand in the flowing of sand articles in molds such as core boxes is highly advantageous to avoid erosion of the parting faces sealed by the sealing strip 20.

By virtue of the fact that the ridge rib 25 is spaced by the seal areas 28 from the adjacent outer ends of the groove wall surfaces 24 providing the edges defining the mouth of the groove 21, and in the preferred form shown the projection height of the ridge rib 25 is actually slightly less than the width of the areas 28 and, in any event tapered convergently from base to crown there is no possibility of pinching any part of the yieldable rib 25 between the parting faces 17 and 18 even during careless or inadvertent relative lateral motion of the parting faces after contact of the parting face 18 with the rib crown 27.

Upon separation of the mold elements the seal 20 expands and the dead air space chambers 30 flatten out with the seal surface areas 28 or expand to the original shape and thus eject any material that may have piled up therein. In this manner the seal strip 30 is self-cleaning in operation. Since the parting face 18 is flat it is easily wiped clean of any material that may drop thereon or be deposited thereon in operation.

Although the parting faces 9 and 10 and also 17 and 18 are shown flat, a salient advantage of the present seal is that it is fully adaptable for any practicable contours of the matching parting faces. This results from the highly resiliently yieldably compressible, self-adjustable, joint-free, continuous character of the seal strip 20, and the fact that it is moldable directly in and to the working contours of the parting faces.

Figure 4:
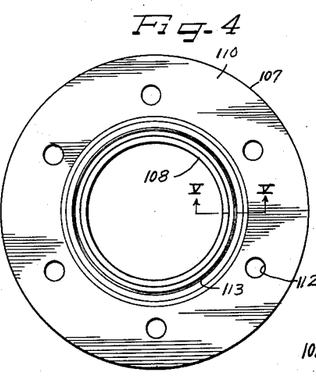
FIGURE 4 is a plan view of an exemplary joint face of a member embodying a seal according to another embodiment of the present invention.
Figure 6:
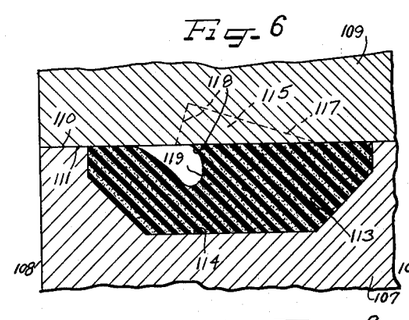
FIGURE 6 is a sectional view similar to FIGURE 5 but showing the seal as placed under pressure between the joint face of the member of FIGURE 4 and a mating member to seal the joint therebetween.

Referring to another seal embodiment and to FIGURE 4, a member 107 is shown representative of chambered structures generally within which pressure must be held in a chamber space 108 in combination with a mating member 109 (FIG. 6). In the assembly, the member 107 presents a joint face 110 in opposed bearing, metal-to-metal contacting engagement with a complementary joint or parting face 111 of the member 109. In this instance the members may be provided with bolt holes 112, although any other means may be provided, depending upon the nature of the assembly for holding the joint or parting faces 110 and 111 of the members together.

Since in this illustrative embodiment it is necessary to prevent escape of pressure from within the chamber 108 through the joint between the parting faces 110 and 111, a seal 113 is provided in the joint entirely about the chamber 108 and in this instance comprising a sealing strip 113 in the form of a ring. The seal 113 is in the form of a compression seal, as shown, comprising a body of compressible, resilient, elastomeric material of the closed cell type and is preferably bonded permanently as by vulcanizing cure in a groove 114 formed in the parting face 110 as close as practicable to the chamber 108.

In a preferred method of molding the seal 113, the material is such as may be cured in situ by vulcanization or baking or exothermic or catalytic curing. To this end, the composition of the seal material may include suitable natural or synthetic rubber, a plasticizer, a vulcanizing agent, and a gas liberating agent capable upon the application of heat of liberating substantial quantities of gas and thereby swelling or expanding the elastomeric composition or compound and producing a self-sustaining resilient, elastic multi-cellular, closed cell sponge rubber-like body.

After the groove 114 has been formed to open through the joint or parting face 110, a master plate M (FIG. 5) is assembled with the parting face 110 and provides with the groove 114 a molding chamber within which a suitable quantity of the raw material of the elastomeric composition for the seal is placed and the assembly placed in a curing oven and subjected to proper temperature for the proper length of time to effect expansion and curing of the seal material into a homogeneous, cellular, sponge body uniformly throughout the length or extent and width of the seal. By having the surfaces within the groove 114 treated to assure active bonding of the material of the seal 113 thereto as an incident to the curing process, and by having the surfaces of the master plate M opposing the groove 114 treated to assure non-adherence thereto of the material of the seal 113, separation of the master plate M from the member 107 and the completed seal 113 after curing is effected by simple lifting away of the master plate for separation of the member 107 therefrom, the seal 13 remaining permanently bonded to the member 107 within the groove 114.

Figure 5:
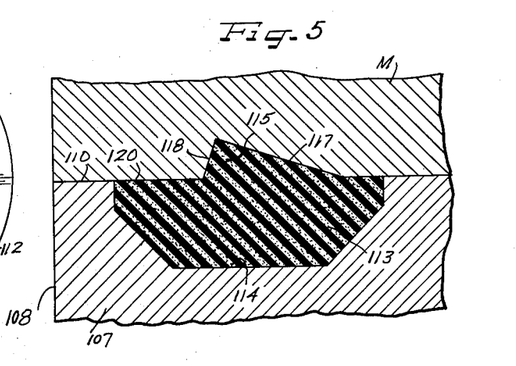
FIGURE 5 is an enlarged fragmentary sectional detail view taken substantially on the line V—V of FIGURE 4 and showing how the seal is adapted to be molded in place in the joint face of the member of FIGURE 4.

By virtue of the separation treatment of the master plate surfaces, as described, and by virtue of the internal pressures developed within the seal material during the curing, a substantially impervious skin is formed on the surfaces of the seal which oppose the master plate M. As a matter of fact, such a skin also develops on those portions of the seal that are bonded within the groove 114 so that if there is any tendency for separation of the seal from the sides of the groove where it runs out at the parting face 110, air within the seal is held against escape and entrance of fluids or other matter into the seal as the separation is precluded.

A highly advantageous feature of the seal 113 resides in the unidirectional pressure sealing function thereof, coupled with firm unwrinkled nonpocketed bearing engagement with the opposing parting face 111 throughout a major extent of the width of the seal. This is accomplished by providing the seal 113 with a compressible unitary sealing ridge 115 which is of substantially wedge shape in cross-section, having a relatively wide side 117 and a relatively narrow opposite side 118. Both of the sides 117 and 118 converge with the face plane of the surface 110, but in opposite directions, and the wide side 117 converges at an angle of substantially lower pitch than the narrow side 118, and present a generally triangular cross-section, in the form shown, in this instance a right-triangular cross-section with the hypotenuse in the plane of the surface 110. If preferred, of course, instead of the side faces 117 and 118 of the compression ridge 115 converging at a point, a flattened crown may be put on the compression ridge. In the form shown however, it will be apparent that by having the crown of the ridge on a relatively sharp peak maximum compression factor will be present at the peak, diminishing progressively to the base or convergence of the with side with the plane of the surface 110.

When the compression ridge 115 is placed under compression by the opposing flat surface or face 111 of the member 109, as shown in FIGURE 6, the wide side 117 makes substantially flat direct engagement therewith and levels out into the plane of the face 110, while the narrow side 118 presses down into the body of the seal 113 and forms a groove pocket 119. By having a substantial flat surface portion 120 between the base convergence of the narrow side 118 with the body of the seal 113 and between such base convergence and the adjacent edge defining the groove 114, substantial accentuation of the pocket groove 119 is attained by drawing down of the surface 120 by the narrow ridge surface 118 during compression.

When the chamber 108 of the assembly is to be pressurized so that pressure must be maintained therein against leakage through the parting joint of the members 107 and 109, the orientation of the seal 113 is such that the narrow side 118 of the ridge 115 is toward the chamber 108, so that the groove 119 will be on the side of the seal nearest the chamber in the compressed condition.

It has been found that through the arrangement whereby the groove 119 is toward the pressure side of the joint, there is evidently not only a trapping of any pressure that may escape through the parting joint into the pocket groove 119, but by pressure developed in the pocket groove 119 a further thrusting of the material bounded by the pressed in surface 118 outwardly and upwardly to increase the sealing engagement of the surface 117 against the opposing face 111.

Figure 7:
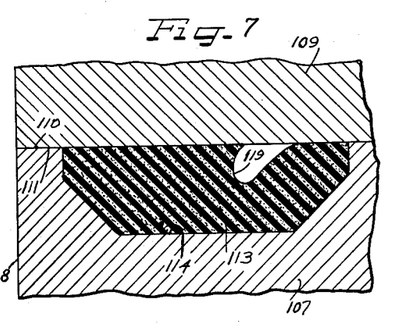
FIGURE 7 is a sectional view similar to FIGURE 6 but showing the seal with the pressure trapped pocket thereof in the opposite side from the passage or cavity defined by the joint members.

In those circumstances where the chamber 108 must be vacuumized, the seal 113 is placed in reverse relation to the chamber 108, that is with the ridge surface 117 toward the inner side and the narrower ridge surface 118 toward the outer side so that the groove 119 will be formed on the outer side of the seal 113, that is the side thereof which is remote from the chamber 108. This arrangement is shown in FIGURE 7. As a result, as vacuum is pulled down in the chamber 108 atmospheric air pressure working from the outside through the joint between the surfaces 110 and 111 is trapped in the groove 119 and there is a vector of forces working against the already strongly compressed ridge material of the seal to enhance thorough sealing hugging of the material of the seal compressed between the groove and the inner side of the seal so as positively to avoid leakage of air into the chamber 108.

Also of quite substantial importance in a vacuumizing situation is the fact that by virtue of the relatively low pitch of the wider seal side face 117, as the ridge 115 is compressed into the body of the seal, the side surface 117 maintains a flat and unwrinkled, pocket free engagement with the surface 111 so that there is no problem of further leakage or seepage of air from the seal into the vacuum chamber. This greatly facilitates and reduces the time interval for pulling a vacuum within the vacuum chamber.

Figure 8:
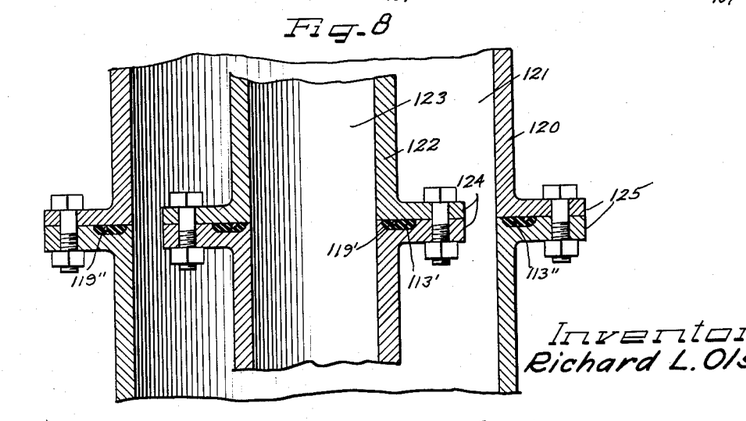
FIGURE 8 is a fragmentary more or less schematic longitudinal sectional detail view through a concentric assembly of members within which variable or differential pressure conditions or other conditions requiring isolation of a flow stream within one of the chambers or passages defined by the assembly.

In FIGURE 8 is shown an example of a construction wherein an assembly of members 120 defines therein a chamber 121 within which is disposed an assembly of members 122 defining therein a chamber 123, the chambers 121 and 123 being subjected to pressure differentials wherein it is desirable to prevent leakage from one of the chambers into the other, but to permit under certain conditions leakage from said other chamber into the one chamber. In the instance shown, the preferred relationship is that there be no leakage from the inner chamber 123 into the outer chamber 121, but under certain circumstances leakage may be permitted from the outer chamber 121 into the inner chamber 123 as when there is an explosive or other undue or greater pressure created in the chamber 121 than in the inner chamber 123. Accordingly, joints between the members 122 formed as by flanges 124 have interposed therebetween a seal 113' which is constructed and arranged substantially like the seal 113 and functions the same and has the pocket groove side toward the inner chamber 123 providing the pressure trapping groove 119'. Thereby, pressure from within the chamber 123 is precluded from leaking through the joint between the flanges 124. On the other hand, when the pressure is greater in the outer chamber 121 than in the inner chamber 123 there may be leakage through the joint between the flanges 124 into the chamber 123 to an extent that may be predetermined by various factors such as the compression factor of the seal 113'. A joint formed as by means of flanges 125 on the outer chamber forming members 120 may be sealed by means of a seal 113" having construction and features of the seal 113 and in this instance, if preferred, the pocket groove side of the seal may be to the outside so that pressure from the outside will be precluded from entering past the pocket groove 119".

For many purposes the seal may be preformed in strip or ring form to be inserted in a groove formed in one parting face of a pair of members to be secured together in sealed relation. In such instance the seal may be adhesively secured into the groove if desired.

A wide range of conditions can be met by the instant seal with respect to size, compression factors, pressure holding ability, leakage in one direction, etc., by varying various structural relationships such as the height, the width, various angles in the compression ridge, various widths and depths of the groove within which the seal is seated, the location from side-to-side of the compression ridge relative to the sides of the groove, and the like. Also, to meet various requirements, the wider side of the compression ridge may be molded with some transverse concavity or convexity, thus desirably effecting the sealing function and affording control of vector of forces of the compressed sealing ridge toward the opposing parting face.

While most plastics or the like have at least some elastomeric properties (and may be so used under this invention) yet it is particularly advantageous to use a readily elastically stretchable or rubber-like type of elastomeric material for at least certain of said closed cell or bubble walls, and for such bubbles in the outwardly projecting and most highly deformed portion.

The cells or bubbles need not all be of the same sizes, materials or other properties, since the advantages of this invention may be realized by the use of various mixtures or blends of different types of materials for the same or different cells or bubbles. As an example, only in this regard and as further discussed below, one integral deformable member under this invention may employ different sizes or strengths of bubbles with, for example, smaller and inherently stronger bubbles in regions where greater strength is required (as adjacent to, or forming, the wear resistant or strength skin for the exposed or nonconfined surfaces or in at least part of the projecting or more highly deformed portion) with larger bubbles, which have lower inherent spring rates and initial stiffnesses (or are more readily compressed) in the well protected interior or confined portions.

Preferably in all high pressure forms of this invention the entire volume of the projections or ribs can be completely compressed and deformed into the confined part. The desired high pressure at which this complete confinement occurs can be selected mainly by the choice of the compression ratio for all of the confined gas or the ratio of the initial and final volumes therefor.

Depending on the desired properties and results and for different types of materials and applications as disclosed herein, the flexible or elastomeric, cell wall material should form from a maximum of about 85% to 90% of the total volume of such a deformable member (particularly for compression seals to withstand high compression engaging pressures and of rubber or rubber type materials such as those disclosed, for example, in my Patent No. 2,815,549) down to percentages as low as about 10% to 4% of the total volume for such cell wall material (particularly for very light unit loads or low pressure applications and/or for high strength materials such, for example, as urethane sealed cell or bubble foams).

As the projection is increasingly deformed and bulk compressed into the confined part of the body by the gas compression, an increasing percentage of all of the fluid filled cells (i.e. those under the compressing surface and in the main effective compressed column) are at about the same pressures. However, these transmitted pressures progressively reduce in approaching an unconfined boundary surface since each bubble's walls have their own elastic stiffness or resistance to deformation.

This last useful effect also gives rise to the local deformability discussed in connection with fluid pressures 39' or 139' in FIGURES 2A, 3A, 5A and 6A. It also (as noted above) helps produce a strong and yet soft or readily deformable skin or boundary region at, or effectively adjacent to, an unconfined surface to resist blowing out or bursting under high pressures of the confined gas. For a given or desired percentage of confined gas (relative to the total volume) this progressive reduction in transmitted pressures and bursting forces is greater for smaller diameter of smaller volume bubbles and increases rapidly as they become smaller, down to practical limits as given herein. In this connection, the above disclosed progressive and rapid decrease in the bubble sizes as they merge into the soft yet strong molded skin over the projection, uses this same effect. Particularly as originally disclosed in connection wtih FIGURES 1 to 8 hereof, this invention may use a relatively random mixture of different sizes of bubbles although relatively uniform sizes in a given region (as in the projection)

may be advantageously provided as is known in this art.

Thus, another important aspect of this invention and its preferred multi-cellular bubble structure is to be found in the preferred range of absolute sizes (or corresponding volumes) of at least the effective preponderance of these fluid filled bubbles, taken in connection with, or for, a desired bubble wall or separation thicknesses (determining the initial percentage of confined gas) and the stiffness or springiness as well as the strengths of the particular material used for such walls in any case. As noted above and also below, there are a number of different factors affecting the relationships for the preferred upper and lower size limits for the bubbles under this invention. In general and particularly for high strength materials and for high percentages of confined fluid or gas, the upper limit for the diameters of the effective preponderances of the bubbles or closed cells under this invention is in the order of about 0.02 to 0.03 inch to thereby benfit by the rapidly increasing resistance against bursting and flexural strength as discussed herein. The lower such limit, particularly for low percentages of confined gas is a practical one, depending on the ability to form interbubble walls of a correspondingly reduced thickness with particular materials and by particular expanding, blowing, or bubble forming techniques and is about 0.001 inch diameter or somewhat less for strong material and relatively thick walls.

In general and as noted above, the smaller these bubbles are (for a given percentage of confined gas down to practical limits) the more effective or stronger they become in providing a soft deformable outer layer and in resisting bursting out of relatively high pressures at unconfined areas. Accordingly, larger diameter bubbles may be used if desired in less critical regions or deep in the initially confined part of the body or even in the inner portion of the projection. In such regions there may also be a higher percentage of confined gas or relatively thinner walls. However, for ease of forming or molding such bulk compressible bodies under this invention, particularly where they are of small cross section, it is simpler to make them generally the same throughout except at the progressive transition or boundary region, as it merges into the skin. Undesirably larger bubbles (particularly close to an unconfined surface) act more like a single large air bag with its necessarily thick confining walls.

Thicker and tougher or more wear resistant (but less flexible) such skins may be used where needed for rough use or the like. Such skins are shown in all forms hereof.

It is to be understood that the above ranges of values for bubble sizes need not apply to each and every closed cell since a small percentage (such as 10% or 15% or more) may be undesirably too large or too small without material adverse effects so long as the effective preponderance of the bubbles are in the preferred range of sizes, particularly in the above noted critical regions effectively close to an unconfined surface. This is intended in the disclosure and claims for all forms and applications of this invention where the bubbles are specified as being small or the like.

Similarly the particular flexible elastomeric material, the process used, and the service requirements of a particular application or use will modify the choice of bubble sizes under this invention. It is to be understood that any suitably flexible and yet strong material, and particularly an elastomeric or resiliently yieldable material, may be used under this invention. A low degree of permanent set under low continued distortion is desirable in certain cases as for seals to hold a pressure difference for long periods.

It is also to be noted that as a practical matter under the teachings of this invention, it is intended that relatively larger sizes of bubble diameters (or toward or even somewhat beyond the upper diameters as given above) are to be used where the percentage of confined gas is quite high in order to be able to practically form interbubble walls of the required thinness. Conversely, for small percentage volumes of confined gas (as from 10% to 15%) the bubble sizes may be correspondingly smaller or in the lower part of the range of sizes if the particular process and elastomeric material used will form such small size cells with the correspondingly thin interwalls.

As shown in the several forms of this invention, relatively rigid means provides an initial confinement for at least a material part of the volume of the resiliently compressible member. Preferably, a major part or more than half of such a member is initially confined. Particularly for applications to be subjected to high pressures or large deflections with a large compression of the resilient member, the confining trench or cavity has a volume large enough to hold substantially all of the cell wall material of the projecting portion as well as the fluid volumes of the cells or bubbles when they are compressed to their maximum amount.

The cellular structure of the projecting portion and particularly the bubble structure, also provides for a local or surface deformability which need not extend all the way into the mass or body of the resiliently compressible material for low compressions. This last is important, particularly for seals, since it permits the use of light engaging pressures. This confiining means may be of various forms such as a recess or slot open at both ends or a trench or one side cavity.

Referring more particularly to FIGURES 2A, 3A, 5A and 6A and to the broader seal aspects of this invention, it is noted that while these four figures may (as noted above) be considered as illustrating enlarged sealing corner or lip portions of the corresponding FIGURES 2, 3, 5 and 6 respectively, yet these four figures may also be considered as showing a broader sealing aspect hereof and other forms of seals or the like. These seals have a main or supporting body portion and an integral, deformed or surface engaging portion. Accordingly, these figures carry the same reference numerals as the corresponding earlier figures plus a prime in each case.

Figures 2A, 3A:
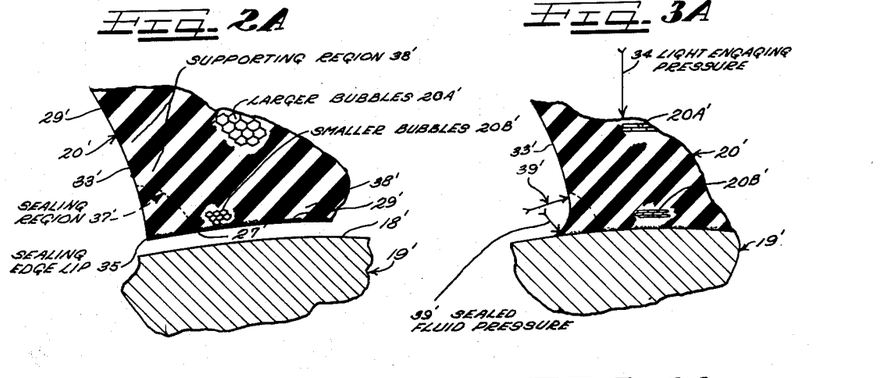
FIGURE 2A is a sectional view like FIGURE 2 but showing a portion thereof on an enlarged scale.
FIGURE 3A is a sectional view like FIGURE 2A but generally related to FIGURE 3 and showing the seal engaged and subjected to pressure to be sealed.
Figure 5A:
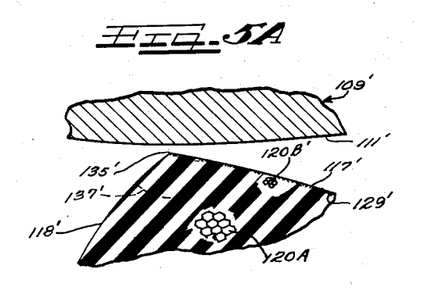
FIGURE 5A is a sectional view like FIGURE 5 but showing a portion thereof on an enlarged scale and with the disengaged seal-engaging surface having a different shape.
Figure 6A:
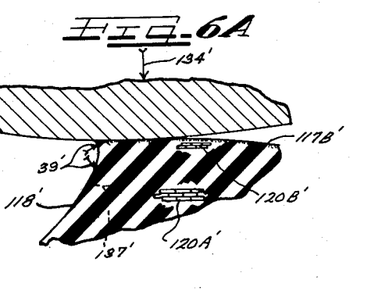
FIGURE 6A is a sectional view like FIGURE 5A but generally related to FIGURE 6 and showing the sealingly pressurized condition thereof.

As shown by 18' in FIGURES 2A and 3A and by 111' in FIGURES 5A and 6A, the compressing or engaging surfaces of the members 19' or 109' need not be exactly flat or planar but may be concavely curved, convexly curved or shaped in other fashions so long as the soft and readily locally deformable surfaces 27' or 117' may readily conform to these rigid surfaces without excessive abrupt changes in curvature or excessive bends. Thus, the rigid surfaces such as 18' or 111' may be considered as substantially flat or planar for this purpose. Similarly surfaces such as 27', 117', 33' and 118' may be somewhat curved or non-planar.

While FIGURES 3 and 6 and their description disclose the use and advantages of high engaging pressures and of a high degree of compression of the projecting portion or the crown down into the trench or cavity in the important high compression seal applications hereof, yet this invention is not so limited in its seal aspects since suitable forms may also be successfully employed to effectively seal fluid pressures when the engaging pressures are quite low as indicated by the legend 34 in FIGURE 3A and the similar legends in the other figures.

The engaging pressures, such as 34 should be adequate to insure an effective engagement of a surface, such as 27', to the surface to be sealed (such as 18') or to ensure an adequate flexible conformation or fitting by the soft or flexible surface. Thus, the required amount of engaging pressure depends, among other factors, on the local or surface softness and conformability of the engaging surface such as 27' and particularly at its effective sealing edge or corner such as 35'.

Due to the small scale, the exact, high engaging pressure deformed shapes of the compressible sealing members are not intended to be exactly shown in FIGURES such as 3 and 6, although these figures do indicate the nature of the dead air spaces or open regions formed when the compressible seal member is fully or highly compressed by the engaging pressure. Broadly, these important open pockets are formed by, or due to, the relatively steep slope at one or both sides of the projecting portion, the rib like ridge, the crown or the like. Also the relatively sharp and nearly 90° dihedral angle formed between the rib side wall and outer surface 27 in FIGURE 2 (or similarly between the steeply sloped projection wall 18 and surface 17 in FIGURE 5) aids in sharply defining and in producing these dead air spaces or pockets. Such corners or well defined or relatively sharp dihedral angles, sealing lip edges or the like, are particularly important for seals or the like.

Essentially, the main or most important of the fluid pressure holding or sealing action is performed at, closely adjacent to, this corner or this sealing lip edge. This important corner or dihedral angle apex has been designated as 35′ in FIGURES 2A and 3A and the closely adjacent region or the sealing region has been designated as 37′ in these two figures. Similar reference characters increased by 100 in each case are used for equivalent portions in subsequent figures. When adequately engaged with the surface to be sealed, this sealing lip edge 35′ (or the like in the other figures) and its immediately adjacent engaged surface along the length of the elongated seal, is effectively and increasingly pressed into tighter engagement with the surface to be sealed by, not only the engaging pressure, but additionally by the fluid pressure or fluid pressure difference to be sealed. This provides a self sealing action wherein increases in the fluid pressure difference to be sealed itself increases the sealing or fluid pressure holding action and effectiveness. This action is in part indicated by the fluid pressure directions indicated by 39′ in FIGURE 3A (and similarly in subsequent figures) showing that the fluid pressure acts normally to its confining surfaces and thus tends to bow or bend the soft flexible and low rate, resiliently compressible side wall 33′ inwardly or concavely as shown so that the sealing region 37′ has an outwardly projecting or reentrant portion at the bottom or engaging portion of wall 33′ adjacent to the lip edge 35′. Accordingly, the fluid pressure in this region (as indicated by arrow 39′) has an effective component normal to the surface to be sealed (such as surface 18′) to thereby provide the above noted self sealing action. In this connection, it is important to note that the effectiveness of this very important self sealing action is greatly enhanced by greater surface softness or greater local deformability or conformability. This last is much increased by the cellular structure of flexible material and more particularly, by gas filled bubbles. It is helped by the wall material being softly elastomeric or having the properties of readily deformable rubber.

This desirable sealing action may be obtained by using a flexible outer skin (such as 29 or 29′) about the exposed surfaces of either an open or porous or closed cell structure yet this skin should be as thin and flexible as wear or life requirements will permit, especially for low engaging pressure seals or the like. The practicability of such seal devices and the effectiveness of this sealing action are materially increased when at least the projecting portion 25 (and particularly its sealing regions such as 37′) comprise a material or adequate percentage of softly deformable sealed cells or bubbles and with an adequate portion of such bubbles being gas filled to provide a high degree of initial softness and deformability and yet to give rapidly increasing local spring rates or stiffnesses as they are more highly compressed (or reduced in volume) under either the fluid pressure loads or the engaging pressure loads.

Such suitably small gas bubbles give very soft, but strong, durable and long life seals, gaskets or the like, having adequate wear resistance and wear strength at their surfaces. They have the high degree of local or surface softness and deformability which is desirable for the reasons given above. The rapidly increasing internal pressures or spring rates under increasing loads operate in increasing the strength and flexibility of such seals and their sealing efficiency.

In FIGURES 2A and 3A, it will be noted that the side walls, such as 33′ in FIGURE 2A, is bowed or bent outwardly or convexly by the engaging pressure as shown in FIGURE 3A. If desired, this wall may be so shaped initially. The sealing effectiveness increased as the dihedral angle becomes more acute. To illustrate this, the side wall 33′ of FIGURE 2A is shown as initially somewhat concave or inwardly curved to hereby increase the initial sharpness of the angle at 35′.

While FIGURE 3 shows this side wall as a whole as being bulged outwardly or convexly by the very high engaging pressure, yet the action of the fluid pressure difference (for the fluid pressure to be sealed) tends to bend or bulge this wall 33′ in the opposite direction as shown in FIGURE 3A. Accordingly, to the extent that this action of the fluid pressure is greater than the opposing or opposite effect of the engaging pressure, such a side wall will always be bulged or bent inwardly to some extent and will thus always form (in service conditions or under sufficient fluid pressure) the desirable outwardly projecting or reentrant side wall portion closely adjacent to the sealing lip edge, to thus give the desired self sealing action as described above. This self sealing action is enhanced by the increased, practically obtainable, local deformability or softness given by the gas filled bubbles.

This local deformability which is increased as the bubble walls are thinner and more flexible, permits progressively decreasing deflections or deformation inward from a fluid pressure bent or concaved surface (such as 29′ of FIGURE 3A) so that the far side need not be correspondingly bent if the wall or body is thick enough. The rapidly increasing spring rates of the gas for each cell help produce this action.

In the general forms of FIGURES 1 to 3 and of FIGURES 4 to 8 (both inclusive), it is to be noted that the elongated and resiliently compressible and flexibly deformable sealing strip has a materially larger volume, body portion initially confined and held in relatively rigid walls or a trench of any of various suitable cross sections. The sealing strip body substantially fills the confining trench to its trench top face and has an integral outwardly extending and continuously elongated projection with an outer crown or forms a ridge rib, here of generally polygonal cross section, and with an outer engaging face. The ridge rib is narrower than the trench width to leave a trench top width along at least one sealing and steeply sloped side of the ridge rib. The outer engaging face is bounded along at least one said sealing side by an important sealing edge lip forming dihedral corner, which in both forms, results from the polygonal shape at the sealing side or is well defined by the sharpness of the solid angle between the outer engaging face and the adjacent and the initially sufficiently steeply sloped side wall of the ridge rib, which is acted on by the fluid pressure to be sealed. The steeper this sealing side slope at the corner (both initially and particularly under fluid pressure) the more well defined and effective is the resulting sealing edge lip so that this slope should be over about 45° and preferably over about 60° from the trench top face (or from the surface to be engaged). The effects of this slope on sealing are illusutrated by the two surfaces 18 and 17 of FIGURE 2. This relationship is better expressed by stating that the initial or uncompressed outer corner or dihedral angle of the crown of the required cellular structure (whether porous or of bubbles) should be sharper than about 135 degrees and preferably sharper than about 120 degrees to provide a sufficiently well defined sealing edge lip under the broad sealing aspects of this invention.

It is thus apparent that FIGURES 4 to 8 inclusive may be considered as directed to another form or species of the same generic sealing invention of FIGURES 1–3 inclusive, but providing only one pocket or dead air or fluid space alongside of the single or one sided sealing lip edge or corner formed by the triangular shaped projection with its single and essentially or mainly one way type sealing lip edge. The generally flattened or generally planar and engaging, outer surface such as 27 of FIGURES 1–3 inclusive need not be initially parallel to the engaged surface 18 but may be inclined at a sufficiently acute angle thereto as shown by the outer and to be engaged surface 17 of the projection in FIGURE 5, in which this surface 17 is at a sufficiently acute angle to ensure adequate conforming and engagement with the surface 11. In any case, it is to be noted that the important sealing lip edge 135′ and a portion of the surface 117′ adjacent to or in the sealing region 137′ of FIGURE 5A are the first to be engaged and are engaged more tightly. This will increase the action of the sealing lip edge.

With further regard to FIGURES 4 to 8 inclusive, it may be noted that only one sealing lip edge is needed in many cases as where the fluid pressure action is essentially one way. Further, this essentially or mainly one way sealing action may be useful in relieving unwanted pressure differences acting in the opposite direction.

As shown in FIGURE 5A, the seal surface 111′ may be inwardly convex as shown, while the surfaces or walls 117′ and 118′ may be similarly outwardly convexed or opposite to the disclosure of FIGURE 2A. As shown in FIGURE 6A, the wall 118′ is bulged inwardly by a sufficiently high fluid pressure relative to the engaging pressure to form the reentrant or outwardly against the fluid pressure projecting sealingly lip or corner 135′ together with its sealing region 137′. As shown at 117B′, the outer or generally flattened deformable engaging surface 117′ need not be engaged throughout its entire width but may have (and will have in this case) one side which is progressively more lightly engaged until it is disengaged or spaced away as shown at 117B′. This will permit pressures acting from this right hand side, in along a surface such as 117B′ to open up or lift up the softly deformable surface 117′, particularly where it is lightly engaged. This may be considered as illustrating the opposite of the desired self-sealing action as given by reentrant or outward projecting corner portion 135′. This portion at 117B′ may also be considered as illustrating a means to provide pressure relief in the opposite direction at a relatively much lower pressure.

As noted above, the cells, and particularly the fluid filled bubbles or gas filled bubbles, need not all be of the same size so long as they are within the ranges as set forth above. Some larger diameter and more readily compressible (or lower initial spring rate and weaker such bubbles) may be employed in the interior or in the supporting structure portion (as shown at 20A′ in FIGURE 2A and at 120A′ in FIGURE 5A) with these larger bubbles either abruptly or gradually merging into smaller, stronger and stiffer bubbles 20B′ of FIGURE 2A or 120B′ of FIGURE 5A. These smaller and stronger bubbles 20B form the stronger but yet highly flexible surface portion. They are adjacent all of the exposed surfaces of the projection and particularly in the active and important sealing region 37′. They may be used in all the forms shown.

Other arrangements of different sizes and types of bubbles may be employed. Different sizes or types of bubbles may be formed and assembled in various known ways as will be understood by those skilled in this art. This includes assembling and bonding together of preformed bubbles.

It is desirable to have the outer strength or wear resisting skin (such as 29 of FIGURE 2 or the like in the other figures) adequately strong and yet very soft to be highly deformable and conformable. It is also to be understood that such outer skins may be made as thin as is required for wear and life in particular applications and that such skins may be made very thin indeed or as almost nonexistent for cases where high surface wear or toughness is not required and particularly for seals which are not subjected to very high presssures.

Figure 9:
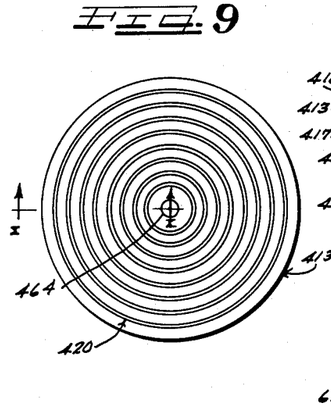
FIGURE 9 is an axial end view of a unit including elongated or circular, concentric, molded seal members.
Figure 10:
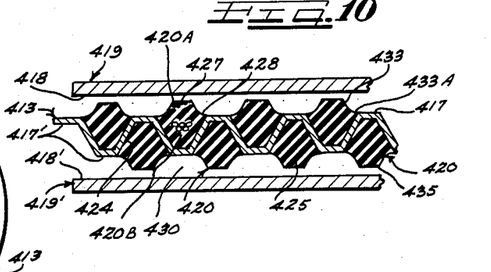
FIGURE 10 is a transverse and axial section taken on the line X—X of FIGURE 10 but enlarged to better show details.

FIGURES 9 and 10 disclose another form of this invention wherein the elongated compressible members are disposed alongside of each other or in concentric, closed loops and as alternately oppositely facing. This single unit is designated as a whole by 413 which comprises the relatively thin sheet metal stamping or the like whose thickness is proportioned to the severity of the loads to be encountered. In this stamping are the oppositely directed and very closely adjacent grooves or trenches 424 projecting in from the upper and lower faces 417 and 417′. The general structure of the compressible members 420 may be considered essentially the same as disclosed in FIGURES 1 to 3 above except that the crown top 427 has its side walls 433 merging into the non-projecting or lateral flat surfaces 428 by a curve or radius 433A instead of by a sharp angle as disclosed above. This form will operate in a generally similar fashion to that of FIGURES 1 to 3 and may be used as seals since corners 435 are retained. A sharply defined angle at 433A is not essential to the forming of some side pocket or dead air space as referred to above since the side wall 433 is steeply sloped at its top corners. The curves at 433A make this form somewhat more like FIGURE 12 (as discussed below) and remove the sharp bend at this point to withstand higher pressures or greater cyclic uses at high pressures. As shown, the units 413 may be suitably guided as by a pin 464 in central holes therethrough so that these units may be arranged in stacks or the like.

Figure 11:
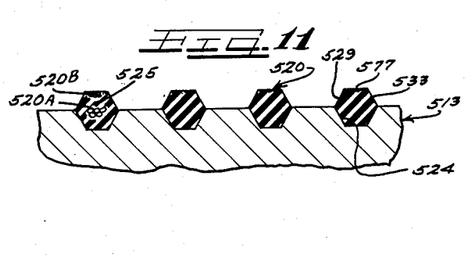
FIGURE 11 is a view similar to FIGURE 10 but showing another cross-sectional form for the elongated, molded members.

The broken away and partially shown unit 513 of FIGURE 11 is a plate-like layer which may be used in various forms and in arrangements as in FIGURES 9 and 10. While the members 520 having the projecting portions 525 extending above the surface 517 and with the crown top 527 which is here shown as flat and forming the outer surface of a hexagon or similar polygon for the cross sectional shape of member 520. This figure illustrates that such cross sections for the compressible member may be employed within the broad scope of this invention and particularly for lower compression seals. It is to be understood that this form of FIGURE 11 may thus be employed in the other arrangements disclosed in this application, particularly for such uses where the total amount of compression is not high.

Figure 12:
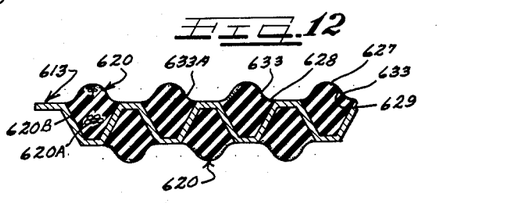
FIGURE 12 is a sectional view similar to FIGURE 10 but showing still another cross-section for the elongated, molded members.

FIGURE 12 discloses a plate-like unit 613 which is here shown as a metal stamping and which may be considered as of the same general type as that disclosed above in connection with FIGURES 12 and 13. Here the compressible members 620 have very importantly different profile or cross sectional shape for their projecting portion 625.

Life of the compressible member 620 is increased, and particularly the life or durability of its projecting portions 625 with its skin 629, when the projecting portion or crown has a cross section or profile so that it has a smoothly progressive changing and reversing curvature from one substantially horizontal or straight line side to the other. This ogee type curve is thus without any abrupt changes in curvature (or sharp bends or high stress points) either initially or at any time during its deflection and deformation to a narrower width as it is pressed down into the cavity or trench by a progressively widening engagement either with a rigid surface or with another such deformable member. This ogee curve may thus smoothly and progressively flatten into a straight line. It is also desirable that the deflections and pressures progressively increasing the confinement and rapidly increasing the internal pressures in the fluid and gas filled bubbles of such members do not at any time (and even up to full compression or substantially complete confinement and the very high pressures at this time) produce any substantial or material forces tending to cause abrupt bends or stress concentrations in the surfaces at 628, 633, and the smoothly curved crown top 627 and particularly where the outer surfaces are not yet restrained or engaged as by the rigid plate or another such flexible and compressible member.

It is particularly important for high pressure applications (or where the rib is pushed almost completely into a flat surface) that there be no appreciable or material forces acting outwardly as tending to burst the skin or bulge it outwardly right at the edges of 628. Such forces should increase progressively in toward the rib center. The strong yet softly deformable, gas filled bubbles cooperate with this ogee curve shape to do this, particularly where such bubbles decrease in size to progressively form the skin. The rapidly increasing spring rates of the gas filled bubbles cooperate in giving this important result.

It is also desirable that there be no substantial forces during such compression to force or pull the sides of the member 620 away from its confining cavity at its edges or where the surfaces 628 join into the faces 617. This is achieved by the compression acting across the width of the profile as it is flattened and compressed. In these regions, it is also desirable that the edge surfaces 628 remain substantially parallel or coplanar with surfaces 617 as the entire surface of the projection is progressively shortened in its cross-sectional length as it is bent down closer to a straight line all the way across the cavity. This last is given by the above noted substantially zero transverse or outward forces at the outer edges of 628, which increase progressively in towards the center of the rib or ridge. All of these desirable features are achieved by profiles, curves, or cross-sections for the projecting portions as disclosed here and comprising ogee type curves smoothly changing from the outermost side edge portions (as at 628, where they are shown as coplanar with surfaces 617) and with smoothly increasing curvatures into the ridge rib portion sides 633 where the curvature reverses and over the top of the ridge and down into a preferably similar profile on the outer side. Preferably but not essentially for all purposes under this invention, these ogee curves are symmetrical from side-to-side.

Referring to all of the several illustrated forms of this invention, it is to be noted that the resiliently compressible members need not be bonded or cemented in place but may be mechanically held in position. However, it is usually desirable to have such members cemented or otherwise bonded in place when they have confined portions as disclosed herein. The confining member or structure need only be relatively more rigid and thus may be of plastic or other somewhat yieldable material in all forms hereof.

It is to be understood that the advantages and features of this invention may be employed for various applications and in various forms, arrangements or combinations without departing from the spirit and novel concepts thereof.

I claim as my invention:

1. A pressure assembly comprising:
   a pair of separable substantially rigid members with opposed parting faces providing a parting joint about a cavity to be substantially sealed against a fluid pressure differential,
   one of said members having in its parting face an elongated recess opening therefrom toward the opposing parting face,
   a strip of elastomeric material having substantially separate, independently acting, small, generally bubble-like gas cells having flexible interconnected walls of the elastomeric material,
   said strip having a main portion sealingly engaged in and initially filling said recess, said strip having an initially outwardly projecting rib portion containing said bubble-like gas cells which extend approximately to an outer surface so that said gas cells may be compressed and conformed to the parting face of the other member and to any irregularities thereon, and said rib portion being compressibly displaced by said parting face of said other member entirely into the initial volume of said main portion by the elastic volume reduction of said gas cells in said main portion.

2. A pressure assembly as defined in claim 1, in which the initially outwardly projecting rib portion is provided with sides sloping outwardly toward said main portion.

3. A pressure assembly as defined in claim 2, in which one of said sides of the rib portion as compressibly displaced is generally concave inwardly, and a sealing lip is thereby defined where said one side joins the surface of the rib portion which engages said parting face of the other member.

4. A pressure assembly as defined in claim 1, in which said one member has an opposite face with an elongated recess offset relative to the first mentioned recess, and said offset recess has therein a sealing rib portion compressibly engaging against a third member.

5. A pressure assembly as defined in claim 1, in which the initially projecting rib portion is narrower at its root than the main portion, and the main portion has along at least one side of the rib root a panel surface which is disposed initially substantially coplanar with the parting face of said one member and adjacent to said rib portion is drawn inwardly away from said parting face of the other member by said compressibly displaced rib portion, and a dead air space chamber is defined alongside the compressibly displaced rib portion cooperatively by the inwardly drawn panel surface and said parting face of the other member.

References Cited in the file of this patent

UNITED STATES PATENTS

| | | |
|---|---|---|
| 1,427,133 | Taliaferro | Aug. 29, 1922 |
| 1,966,202 | Pfefferle | July 10, 1934 |
| 1,976,797 | Naylor | Oct. 16, 1934 |
| 2,092,393 | Hewitt | Sept. 7, 1937 |
| 2,447,340 | Jackson | Aug. 17, 1948 |
| 2,462,493 | Hamer | Feb. 22, 1949 |
| 2,510,417 | Rehklau | June 6, 1950 |
| 2,559,806 | Thompson | July 10, 1951 |
| 2,720,329 | Kochner | Oct. 11, 1955 |
| 2,737,503 | Sprague | Mar. 6, 1956 |
| 2,744,847 | Orr | May 8, 1956 |
| 2,768,407 | Lindeman | Oct. 30, 1956 |
| 2,775,471 | Douglass | Dec. 25, 1956 |
| 2,786,697 | Rescheneder | Mar. 26, 1957 |
| 2,896,974 | Bush | July 28, 1959 |
| 2,911,207 | Coble et al. | Nov. 3, 1959 |
| 2,982,536 | Kordes | May 2, 1961 |
| 2,995,057 | Nenzell | Aug. 8, 1961 |
| 3,011,218 | Mitten | Dec. 5, 1961 |

FOREIGN PATENTS

| | | |
|---|---|---|
| 1,055,534 | France | Oct. 14, 1953 |